United States Patent
Atsatt et al.

(10) Patent No.: US 10,223,014 B1
(45) Date of Patent: Mar. 5, 2019

(54) MAINTAINING RECONFIGURABLE PARTITIONS IN A PROGRAMMABLE DEVICE

(71) Applicant: Intel Corporation, Santa Clara, CA (US)

(72) Inventors: Sean R. Atsatt, Santa Cruz, CA (US); Andrew Draper, Chesham (GB); Ting Lu, Austin, TX (US); Steve Tuyen Vu, Austin, TX (US); Scott Weber, Piedmont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,058

(22) Filed: Sep. 28, 2017

(51) Int. Cl.
*G06G 7/38* (2006.01)
*H03K 19/173* (2006.01)
*G06F 3/06* (2006.01)

(52) U.S. Cl.
CPC .......... *G06F 3/0622* (2013.01); *G06F 3/0629* (2013.01); *G06F 3/0679* (2013.01)

(58) Field of Classification Search
None
See application file for complete search history.

(56) References Cited

U.S. PATENT DOCUMENTS 6,526,557 B1 * 2/2003 Young .............. H03K 19/17756
326/38
8,786,310 B1 * 7/2014 Lu ............................. G06F 7/38
326/38

OTHER PUBLICATIONS

U.S. Appl. No. 15/638,151, filed Jun. 29, 2017, Atsatt.

* cited by examiner

*Primary Examiner* — Anh Q Tran
(74) *Attorney, Agent, or Firm* — Fletcher Yoder, P.C.

(57) ABSTRACT

A system for maintaining reconfigurable partitions in an integrated device includes a first buffer having channels that store configuration data and a mask. The system also includes first decompression circuitry having a second buffer coupled to the first buffer that stores the configuration data and second decompression circuitry having a third buffer coupled to the first buffer that stores the mask. The system also includes partition maintenance circuitry that applies the mask to the configuration data after the first decompression circuitry has decompressed the configuration data and the second decompression circuitry has decompressed the mask.

20 Claims, 14 Drawing Sheets

MAINTAINING RECONFIGURABLE PARTITIONS IN A PROGRAMMABLE DEVICE

BACKGROUND

The present disclosure relates generally to configuration of programmable devices, such as field programmable gate arrays (FPGAs). More particularly, the present disclosure relates to maintaining reconfigurable partitions in programmable devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern electronics such as computers, portable devices, network routers, data centers, Internet-connected appliances, and more, tend to include at least one integrated circuit device. Integrated circuit devices take a variety of forms, including processors, memory devices, and programmable devices, to name only a few examples. A field programmable gate array (FPGA) is one type of programmable device utilizing integrated circuits. Programmable devices may include logic that may be programmed (e.g., configured) after manufacturing to provide a wide variety of functionality based on various design possible within the programmable devices. Thus, programmable devices contain programmable logic (e.g., logic blocks) that may be configured and reconfigured to perform a variety of functions on the devices, according to a configured design. The integrated circuit devices may be configured in numerous difference configurations. These configurations are generally loaded into the integrated circuit devices. However, partially reconfiguring the programmable device may be problematic for situations where multiple users share a common device but distinct portions of the device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for maintaining reconfigurable partitions in an integrated circuit (e.g., a programmable device such as an FPGA). Some designs may be programmed in the integrated circuit that target partial reconfiguration regions without changing configurations of adjacent regions. For instance, a server having multiple virtual machines may enable a user to change a region allocated to the user without enabling the user to change other regions. A configuration controller, before or during runtime, may generate a mask for a partition that indicates resources to which the partition is associated. The configuration controller may use the mask to reconfigure the partition without changing other partitions.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to partial reconfiguration of only a portion of a programmable fabric using a mask to determine which resources may be changed by the partition. By using a mask, a central authority (e.g., server owner) may authenticate writing using the masks without having knowledge of what is actually in the partition or its configuration. Thus, proprietary information may be used without sharing the information with the central authority. Furthermore, any updates to the configuration may be implemented without re-checking with the central authority regarding permissions.

While the techniques of this disclosure are described chiefly in the context of reconfigurable devices, such as programmable logic devices with field programmable gate array (FPGA) fabric, this is meant to be illustrative and not limiting. Indeed, the filtering circuitry of this disclosure may be implemented in other integrated circuit devices. For example, other types of integrated circuits, such as applicant-specific integrated circuits (ASICs), microprocessors, memory devices, transceivers, and the like, that may include regions of programmable logic.

Figure 1:
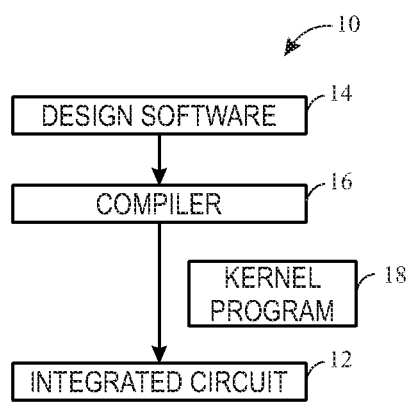
FIG. 1 is a block diagram of a system that utilizes partial reconfiguration masking, according to an embodiment of the present disclosure.

With the foregoing in mind, FIG. 1 illustrates a block diagram of a system 10 for configuring a programmable device, according to an embodiment of the present disclosure. A designer may implement functionality on an integrated circuit, such as a reconfigurable integrated circuit 12, such as a field programmable gate array (FPGA). A designer may implement a circuit design to be programmed onto the integrated circuit 12 using design software 14, such as a version of Quartus by Intel Corporation. The design software 14 may use a compiler 16 to generate a low-level circuit-design, which may be provided as a kernel program 18, sometimes known as a program object file or bitstream, that programs the integrated circuit 12. That is, the compiler 16 may provide machine-readable instructions representative of the circuit design to the integrated circuit 12.

Figure 2:
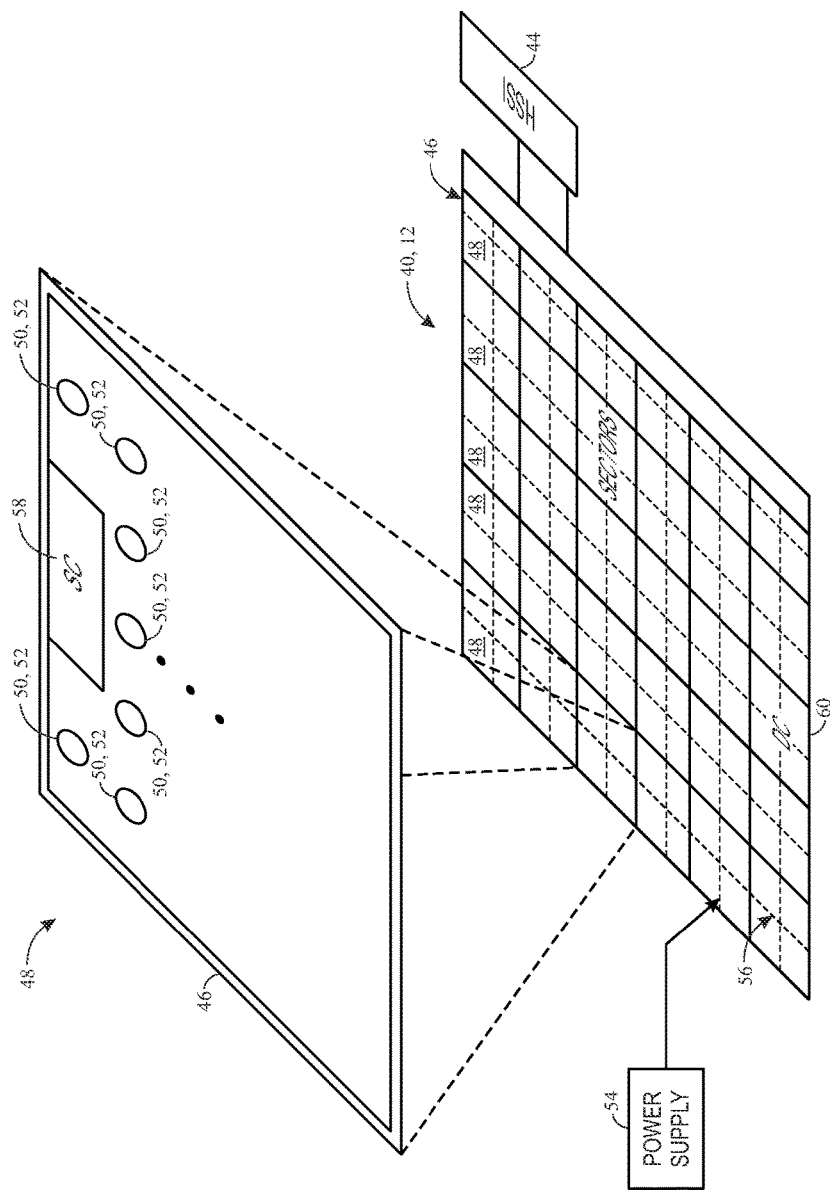
FIG. 2 is a block diagram of a programmable logic device that may include partial reconfiguration logic, according to an embodiment of the present disclosure.

The integrated circuit 12 may be a programmable logic device, such as a field programmable gate array (FPGA) 40, as shown in FIG. 2. For the purposes of this example, the FPGA 40 is referred to as an FPGA, though it should be understood that the device may be any suitable type of programmable logic device (e.g., an application-specific integrated circuit and/or application-specific standard product). In one example, the FPGA 40 is a sectorized FPGA of the type described in U.S. Patent Publication No. 20160049941, "Programmable Circuit Having Multiple Sectors," which is incorporated by reference in its entirety for all purposes.

In the example of FIG. 2, the FPGA 40 may include transceiver circuitry (e.g., a high speed serial interface) 44 for driving signals off of the FPGA 40 and for receiving signals from other devices. Interconnection resources 46 may be used to route signals, such as clock or data signals, through the FPGA 40. The FPGA 40 of FIG. 2 is sectorized, meaning that programmable logic resources may be distributed through a number of discrete programmable logic sectors 48. Each programmable logic sector 48 may include a number of programmable logic elements 50 having operations defined by configuration memory 52 (e.g., configuration random access memory (CRAM)). The programmable logic elements 50 may include combinational or sequential logic circuitry. For example, the programmable logic elements 50 may include look-up tables, registers, multiplexers, routing wires, and so forth. A designer may program the programmable logic elements 50 to perform a variety of desired functions. A power supply 54 may provide a source of voltage and current to a power distribution network (PDN) 56 that distributes electrical power to the various components of the FPGA 40. Operating the circuitry of the FPGA 40 causes power to be drawn from the power distribution network 56.

There may be any suitable number of programmable logic sectors 48 on the FPGA 40. Indeed, while 29 programmable logic sectors 48 are shown here, it should be appreciated that more or fewer may appear in an actual implementation (e.g., in some cases, on the order of 50 to 100 sectors or more). Each programmable logic sector 48 may include a sector controller (SC) 58 that controls the operation of the programmable logic sector 48. Each sector controller 58 may be in communication with a device controller (DC) 60. Each sector controller 58 may accept commands and data from the device controller 60, and may read data from and write data into its configuration memory 52 based on control signals from the device controller 60. In addition to these operations, the sector controller 58 may be augmented with numerous additional capabilities. For example, such capabilities may include locally sequencing reads and writes to implement error detection and correction on the configuration memory 52 and sequencing test control signals to effect various test modes.

The sector controllers 58 and the device controller 60 may be implemented as state machines and/or processors. For example, each operation of the sector controllers 58 or the device controller 60 may be implemented as a separate routine in a memory containing a control program. This control program memory may be fixed in a read-only memory (ROM) or stored in a writable memory, such as random access memory (RAM). The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic sectors 48. This may provide usable extensibility in an efficient and easily understood way. This may be useful because new commands could bring about large amounts of local activity within the sector at the expense of only a small amount of communication between the device controller 60 and the sector controllers 58.

Each sector controller 58 thus may communicate with the device controller 60, which may coordinate the operations of the sector controllers 58 and convey commands initiated from outside the FPGA device 40. To support this communication, the interconnection resources 46 may act as a network between the device controller 60 and each sector controller 58. The interconnection resources may support a wide variety of signals between the device controller 60 and each sector controller 58. In one example, these signals may be transmitted as communication packets.

The FPGA 40 may be electrically programmed. With electrical programming arrangements, the programmable logic elements 50 may include one or more logic elements (wires, gates, registers, etc.). For example, during programming, configuration data is loaded into the configuration memory 52 using pins and input/output circuitry. In one example, the configuration memory 52 may be implemented as configuration random-access-memory (CRAM) cells. The use of configuration memory 52 based on RAM technology is described herein is intended to be only one example. Moreover, configuration memory 52 may be distributed (e.g., as RAM cells) throughout the various programmable logic sectors 48 the FPGA 40. The configuration memory 52 may provide a corresponding static control output signal that controls the state of an associated programmable logic element 50 or programmable component of the interconnection resources 46. The output signals of the configuration memory 52 may be applied to the gates of metal-oxide-semiconductor (MOS) transistors that control the states of the programmable logic elements 50 or programmable components of the interconnection resources 46.

The sector controller 58 of the programmable logic sector 48 is shown to read and write to the CRAM memory 52 by providing an ADDRESS signal to an address register 70 and providing a memory write signal (WRITE), a memory read signal (RD DATA), and/or the data to be written (WR DATA) to a data register 72. These signals may be used to cause the data register 72 to write data to or read data from a line of configuration memory 52 that has been activated along an address line 74, as provided by the ADDRESS signal applied to the address register 70. Memory read/write circuitry 76 may be used to write data into the activated configuration memory 52 cells when the data register 72 is writing data, and may be used to sense and read data from the activated configuration memory 52 cells when the data register 72 is reading data.

Figure 3:
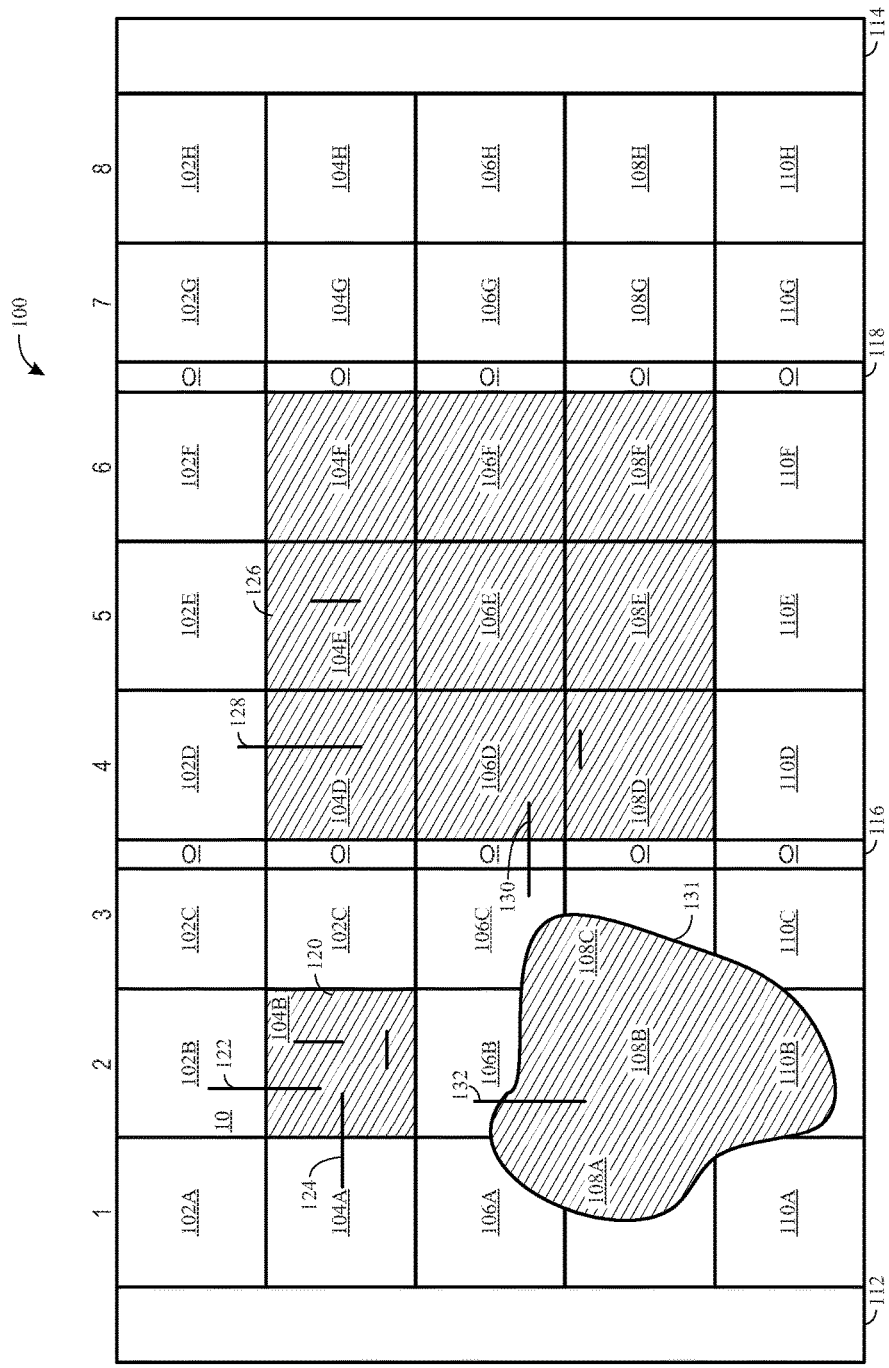
FIG. 3 is a block diagram view of the programmable fabric of the programmable logic device of FIG. 2, according to an embodiment of the present disclosure.

Programmable devices (e.g., FPGA 40) may be programmed in an initial configuration and/or may have portions of the programmable device that are reconfigured during operation of other portions of the programmable device during a partial reconfiguration. FIG. 3 is a block diagram view of a programmable fabric 100, according to an embodiment of the present disclosure. The programmable fabric 100 includes sectors 102A, 102B, 102C, 102D, 102E, 102F, 102G, and 102H, collectively referenced as sectors 102A-102H, in a first row. Similarly, the programmable fabric 100 includes sectors 104A, 104B, 104C, 104D, 104E, 104F, 104G, and 104H, collectively referenced as sectors 104A-104H, in a second row, and includes sectors 106A, 106B, 106C, 106D, 106E, 106F, 106G, and 106H, collectively referenced as sectors 106A-106H, in a third row. Moreover, the programmable fabric 100 includes sectors 108A, 108B, 108C, 108D, 108E, 108F, 108G, and 108H, collectively referenced as sectors 108A-108H, in a fourth row, and sectors 110A, 110B, 110C, 110D, 110E, 110F, 110G, and 110H, collectively referenced as sectors 110A-110H, in a fifth row. Any of the sectors in any row, collectively referenced as sectors 102A-110H, may include a logical grouping of logical elements in the programmable fabric 100. For example, each sector of the sectors 102A-110H may include logic elements that are each capable of performing similar tasks. For example, each sector may include logic elements that would be typically be used in the programmable fabric 100 by each user or function.

Additionally or alternatively, some sectors of the sectors 102A-110H may perform different tasks. In some embodiments, rows or columns of the sectors 102A-110H may be directed to different functions. For example, sectors 102A and 104A may be suitable for a first function (e.g., digital signal processing, multiplication, etc.) while other sectors 102B and 104B may be suitable for a second function (e.g., custom LUT-based functions). Additionally or alternatively, multiple functions may be configured into each sector. Moreover, each sector 102A-110H may include local resources, such as configuration RAM, embedded RAM, magnetoresistive RAM, routing (e.g., wires, trace, etc.), registers, and/or clocking. In some embodiments, clocking may be shared between sectors. In such embodiments, the routing within each sector may be used to route clocking to relevant portions using a clock signal received at the sector from outside the sector.

Although the foregoing discusses and illustrates forty sectors, various embodiments may include more (e.g., 100) or less (e.g., 10) sectors. Moreover, the programmable fabric 100 may include any number of sectors depending any number of factors. Indeed, in some embodiments, a programmable device may include only a single sector since non-sectored programmable devices may be deemed to include a single sector. Thus, programmable devices may conceivably include any number of sectors from one to any number greater than one.

The programmable fabric 100 also includes global resources 112, 114, 116, and 118. The global resources 112, 114, 116, and 118 include resources that are shared between the sectors 102A-110H and outside of the physical regions of the sectors 102A-110H and/or partitions of the programmable fabric 100. These global resources 112, 114, 116, and 118 may include clock routing to each sector, phase lock loop (PLL) circuitry, input-output (TO) circuitry, Peripheral Component Interconnect Express (PCIe) circuitry, hardware platform interface (HPI), a hard processor system (HPS), and/or other suitable circuitry. The programmable fabric 100 may also include spanning resources that span physical partitions and/or sectors. These spanning resources may include a horizontal wire and a vertical wire utilized by the partition to transmit and/or receive data and/or output data. The spanning resources may also include scanning chains used for register readback from the partitions.

The programmable fabric 100 may also include partitions that may be directed to different functions, users, machines, permissions, or other divisions of the programmable device. As illustrated, some partitions, such as a partition 120, are entirely within and fully encompass a sector, such as sector 104B. The partition 120 utilize spanning resources 122 and 124 that extend into the partition 120 from sectors 102B and 104A, respectively. The programmable fabric 100 may also include partitions, such as partition 126, that spans multiple sectors, such as sectors 104D, 104E, 104F, 106D, 106E, 106F, 108D, 108E, and 108F. The partition 126 utilizes spanning resources 128 and 130. Some partitions, such as partition 131, extend beyond and/or do not fully encompass sectors in which the partition is located. For example, the partition 131 fully encompasses sector 108b and partially encompasses sectors 106a, 106b, 106c, 108a, 108c, 110a, 110b, and 110c. The partition 126 utilizes spanning resource 132.

As discussed below, resources within and/or spanning into a partition are managed by the system to ensure they are not modified by partitions that do not own them. The fundamental mechanism relies on the fact that configuration of a partition relies on a read/modify/write sequence that uses mask images that define the exact resources that are to be left un-modified. To provide guaranteed isolation, these mask images are manipulated and extended in order to prevent partitions from utilizing resources that do not belong to them.

To provide isolation between partitions, an "allowed" masks set for each partition may be generated to cover all resources that are owned by a partition. The masks identify both the sector and the resources used in that sector by a particular partition. For each sector there is then a set of masks that define the resources allocated and allowed for each partition. When a partition in a sector is updated, its allowed masks are merged with an inverted allowed masks (e.g., "Not Allowed") of other partitions in that sector to prevent that partition from affecting any resources in the sector (and other sectors) it does not own. The mask merging may be done statically at the time partitions are created and checked by a central authority that assigned the partitions. Additionally or alternatively, the masks may be merged at runtime by a device configuration system. Merging on the device may allow resources owned within a partition to be modified without using mask merging action at a central server, but may consume more resources on the programmable device. Merging on the device may also enable a user design to maintain encryption until it arrives on the device.

Figure 4:
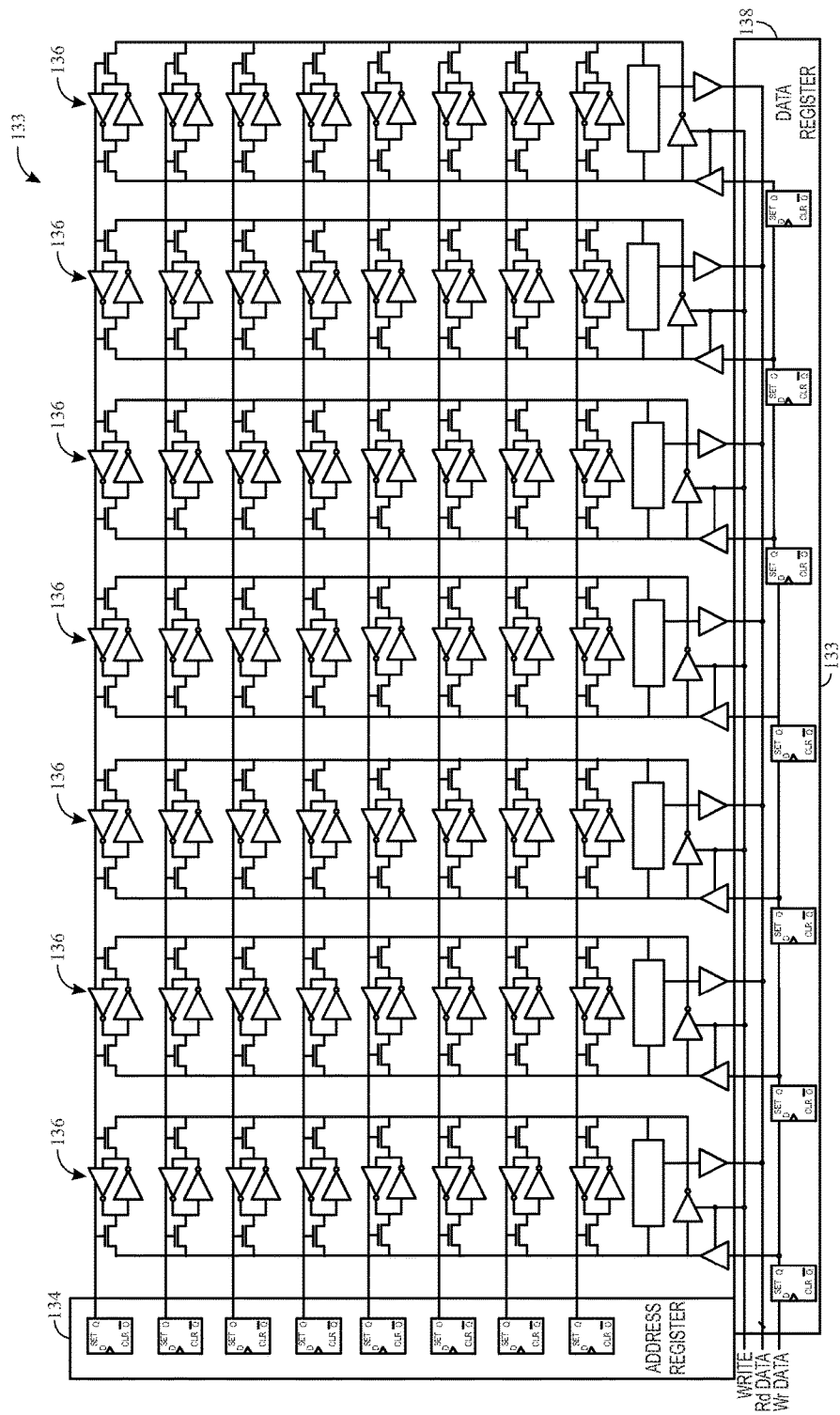
FIG. 4 illustrates a schematic diagram of a configuration RAM of the programmable fabric of FIG. 3, according to an embodiment of the present disclosure.

During a CRAM configuration, CRAM is written by selecting an address of a word to be written in the CRAM. CRAM words, unlike some words in other memory types, may be thousands of bits wide. FIG. 4 illustrates a simplistic CRAM model 133 that includes an address register 134 that controls access to one or more rows of storage units 136 used to store data from a data register 138 when the address register 134 indicates that a respective storage unit 136 is to store data, according to an embodiment of the present disclosure. The CRAM model 133 may include only a small fraction of CRAM included in a sector.

The data register 138 contains logic to load data to and/or from the CRAM and to shift in and out the data to be read or written to the CRAM. The data register 138 also contains logic and also the capability to perform arithmetic operations such as AND, OR, XOR, NOT, and/or Zero data stored in registers. The arithmetic operations allow read/modify/write functions so that individual bits in a CRAM word can be modified without affecting other bits in the word. This capability allows a region to be updated without effecting neighbor regions.

Partial reconfiguration of a region of the CRAM uses the arithmetic capability in a MASK/OR process. The MASK/OR involves using a mask to define the extent of the reconfigured region (e.g., an entire partition). This means that a configuration controller does not need to know the current state of the configuration nor map a "safe" reconfiguration (e.g., no shorts that may cause unwanted effects) from the current configuration to the target configuration. Instead, the configuration controller may reset the configuration then loading in a new configuration. As discussed below, the partial reconfiguration uses an image used as a mask, an x mask image, and a y mask image. An image is the set of words which are loaded into the data register and applied to the range of addresses of that region.

Figure 5:
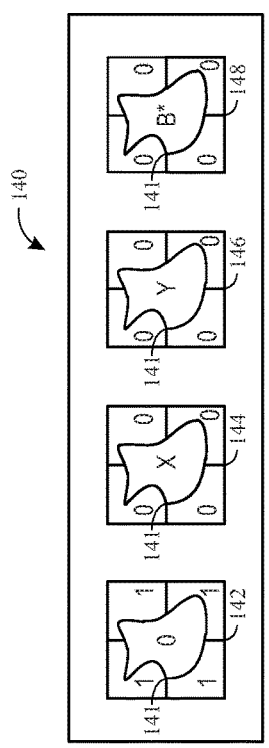
FIG. 5 illustrates reconfiguration masks for use in reconfiguration of the programmable fabric of FIG. 3, according to an embodiment of the present disclosure.

FIG. 5 illustrates reconfiguration masks 140 stored in memory for configuring a region 141 using a MASK/OR process, according to an embodiment of the present disclosure. The reconfiguration masks include a zero mask 142 that zeroes out only the region to be reconfigured. As previously noted, using this zero mask 142 ensures that the programmable logic is reset to ensure that no connections are made to an incompletely configured region that may result in shorts that could cause undesired results from the programmable device. The reconfiguration masks 140 includes an x mask 144, a y mask 146, and a b* mask 148 each as examples including various configurations within the region 141.

Figure 6:
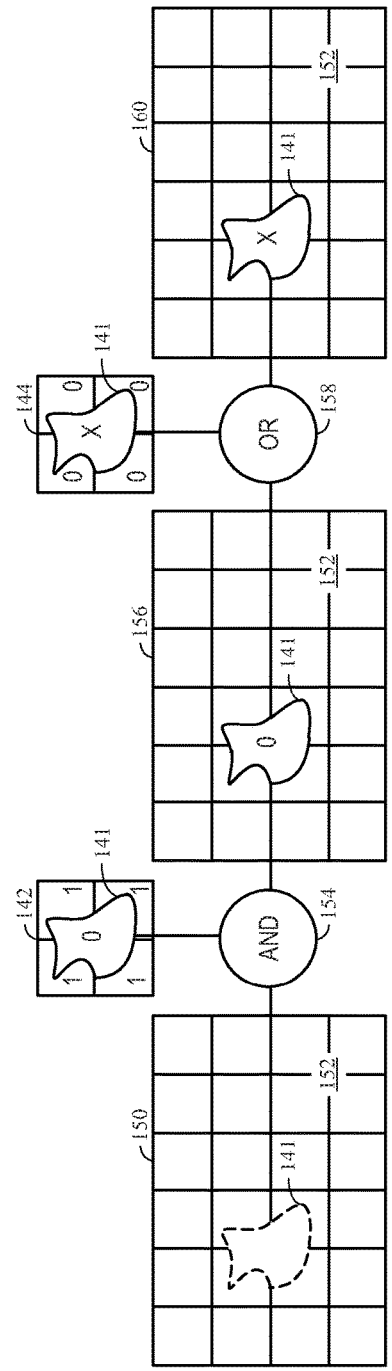
FIG. 6 is a block diagram view of a partial reconfiguration process using the reconfiguration masks of FIG. 5, according to an embodiment of the present disclosure.

FIG. 6 illustrates a block diagram view of the MASK/OR process that partially reconfigures the programmable device in the region 141, according to an embodiment of the present disclosure. A current configuration image 150 includes the region 141 to be reconfigured and remaining portion 152 that is not to be reconfigured. The current configuration image is AND'ed 154 with the zero mask 142 to zero out the region 141 without changing the remaining portion 152 of the programmable device. In other words, the zero mask 142 is used by the configuration controller to return the partial reconfiguration region 141 to zero through a read/modify/write. The zero mask has ones in each bit of each word that are to be left unmodified and a zero in the locations that are to be modified.

The AND 154 results in a zeroed-out configuration mask 156. The zeroed-out configuration mask 156 is OR'ed 158 with a configuration image, such as the x mask 144, to be written to the region 141 resulting in a reconfigured mask image 160. The x mask 144, as illustrated, contains a zero in the remaining portion 152 to be left un-modified and x-configuration data values (e.g., 0's and/or 1's) in the region 141 to be reconfigured. During the AND and the OR operations, the logic in the remaining portion 152 that is not in the region 141 remains unchanged. Although the foregoing discusses using a mask with one and zeros in specific locations with AND and OR logic, some embodiments may invert the ones and zeroes and use inversion logic, such as NANDs, NORs, and/or inversion gates.

If the zero mask 142 and the configuration masks 144, 146, and 148 are properly established, the configuration controller will not change resources that do not belong to a partition from being changed when the region 141 is being reconfigured. Moreover the zeros in the zero mask 142 represent the exact set of resources which belong to a partition.

Figure 7:
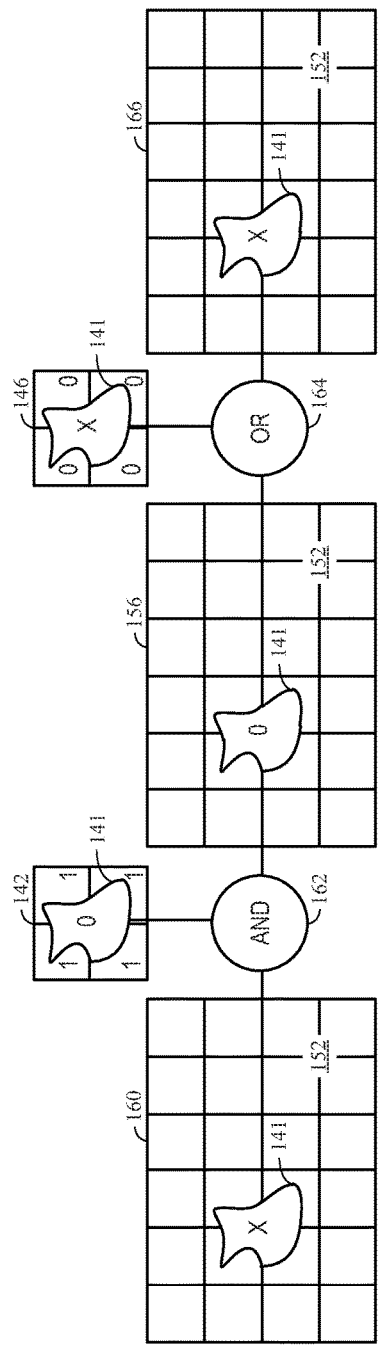
FIG. 7 is a block diagram view of a partial reconfiguration process after the reconfiguration process of FIG. 6, according to an embodiment of the present disclosure.

FIG. 7 illustrates a block diagram view of the MASK/OR process of partially reconfiguring the programmable device in the region 141 from the reconfigured mask image 160, according to an embodiment of the present disclosure. The reconfigured mask image 160 is zeroed out using the zero mask 142 AND'ed 162 with the reconfigured mask image 160. This AND results in the zeroed-out configuration mask 156 that is OR'ed 164 with the y mask 146 to result in the y-configured image 166.

When a mask extends over partition boundaries, a new mask may be created. To create a mask that covers resources that traverse a partition boundary, an additional zero mask may be created for each sector to which the resource extends. These additional masks may be referred to as allowed masks. A set of not allowed masks for each sector may be created by inverting the zeros masks of all regions that may be loaded into a sector and AND'ing the masks together. The resulting mask has a 0 in every location that is not allowed to be modified when modifying the partition. To prevent a region 141 from changing another region, the not allowed mask is inverted and OR'ed with the zero mask and AND'ed with the to be written configuration mask (e.g., x mask 146) to create a new mask (e.g., reconfigured mask image 160).

The generation of masks can occur on a certified server or on the programmable device either at run time or before run time. For example, in some embodiments, the device (e.g., configuration controller) performs the merging of masks, signs the masks, and store them offchip in flash memory. Additionally or alternatively, the configuration controller can fetch the masks for all regions that intersect a sector and dynamically generate a new mask. The new mask can be generated in a system data manager (SDM) for the programmable device. Additionally or alternatively, the masks may be generated in place in the data register by sending the masks to the data register one at a time utilizing the arithmetic operations of the data register.

In some embodiments, the configuration system (e.g., SDM) may compare allowed masks of each region and report a violation of resource separation. In some embodiments, when the configuration system detects a violation, the configuration may halt configuration of the programmable device.

Local Resources

Embedded random accessible memory (ERAM) are individually addressable by the configuration system. The configuration system addresses them to a specific location with a packet header. To prevent un-authorized overwrites, an authenticated list of allowed ERAM address for each region may be loaded into the configuration system as an ordered list. The configuration system processor (e.g., SDM, local/sector managers) writes the packet header from the ordered list into the ERAM packet to ensure that writing only occurs to only authorized addresses.

Global Resources

Global resources are often configured once and not updated by partition updates. For example, global resources may include input/output ports (e.g., 1048), interfaces (e.g., high-speed serial interface—HSSI), hard processor systems (HPS), a clock network, and/or other resources shared between the partitions. Often, they are defined by a base partition at the time the set of partitions is defined. For global resources that are dynamically reconfigurable by the core logic, the base partition may claim the resources that provide access to the reconfiguration pathways.

Figure 8:
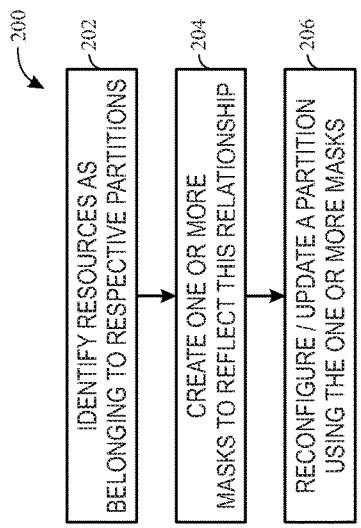
FIG. 8 is a flow diagram illustrating a process for generating masks, according to an embodiment of the present disclosure.

FIG. 8 is a flow diagram of a process 200 for generating masks, according to an embodiment of the present disclosure. First, resources are identified as belonging to respective partitions or regions (block 202). In some embodiments, the partitions may include a base partition that is assigned the global resources. Masks are created to describe this ownership (block 204). The masks may include allowed and not allowed masks to indicate resource ownership for the partition. The allowed mask images define local and spanning resources assigned to each partition. A local resource mask (including the local resources) is copied to a region partial reconfiguration mask (e.g., x mask 144). Spanning resources masks (including a set of horizontal and/or vertical wires) add to the region partial reconfiguration mask resources that are used by the region 141 to enter and exit the region 141. A central authority may define the existence of the partitions and set ownership of resources. For example, this central authority may be a server owner and/or operator. The mask images may also be signed by the central authority at time of generation. Additionally or alternatively, the masks may be signed by the partition owner (e.g., virtual machine client/user) when the partition is assigned to the partition owner.

During runtime, a partition is updated using the masks (block 206). The masks also include allowed masks. The masks for a partition include a not-allowed mask that is the inverted allowed masks of all potentially intersecting regions. This not-allowed mask is combined (e.g., in the hardware) with the reconfiguration masks of the partition to be updated to create a new reconfiguration mask that prevents changing the state of resources that a partition does not own. When the programmable device is sectorized, the number of potentially intersecting partitions is relatively low. When each partition is within a sector, the number of potentially intersecting partitions may be completely eliminated.

At least a portion of the foregoing process may be implemented using tangible, non-transitory, and computer-readable medium that has instructions stored thereon. These instructions may be executed by the server, the configuration controller, the sector controller 58, the device controller 60, and/or any other suitable processor.

Figure 9:
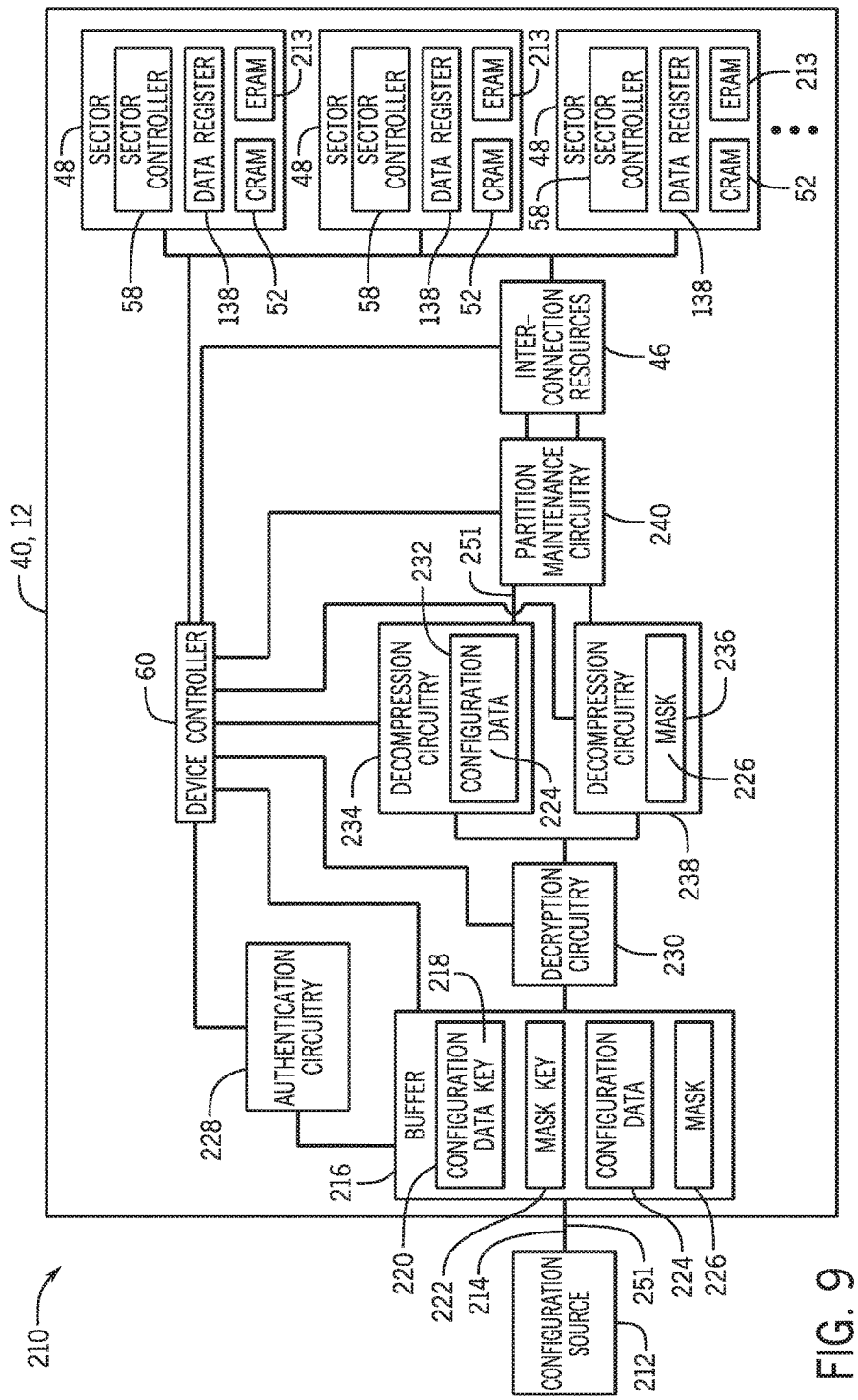
FIG. 9 is a block diagram of a system that maintains reconfigurable partitions of the programmable logic device of FIG. 2, according to an embodiment of the present disclosure.

FIG. 9 is a block diagram of a system 210 that maintains reconfigurable partitions of the programmable logic device (e.g., FPGA 40) of FIG. 2, according to an embodiment of the present disclosure. The system 210 may include a configuration source 212 that sends data (e.g., a data stream 214) associated with configuring or programming the FPGA 40. The configuration source 212 may include, for example, memory, a storage device, instructions received from a processor, or any suitable other data source, and may form, for example, a component of a data center, a networking system, a security system, or any other suitable implementation. The configuration source 212 may include, for example, the design software 14 and/or the compiler 16. As such, the data stream 214 may include, for example, the kernel program 18 (e.g., a program object file or bitstream). The data stream 214 may include suitable data that may facilitate configuring or programming the FPGA 40. For example, the data stream 214 may include configuration data used to configure the FPGA 40, a mask used to maintain the reconfigurable partitions of the FPGA 40, an authentication key (or keys) used to authenticate the configuration data, and an authentication key (or keys) used to authenticate the mask. Specifically, the configuration data may reconfigure at least a partition of the FPGA 40 (e.g., partially reconfigure the FPGA 40) when programmed in the FPGA 40. At least some portions of the data stream 214 may be encrypted and/or compressed. The configuration source 212 may send the data stream 214 in packets to the FPGA 40. In some embodiments, the authentication keys may be sent in earlier packets than the configuration data and the mask. As such, different authentication keys may be used to protect allowed operations as a function of a partially reconfigurable region (e.g., 141) and assigned resources of the partially reconfigurable region as apart from or regardless of the configuration data 224 (e.g., used to implement a user design on the partially reconfigurable region).

The configuration data may be used by one or more sector controllers 48 to modify contents of CRAM cells 52 and/or ERAM cells 213 of one or more sectors 48 based on the mask. In particular, the configuration data may include data to be sent to CRAM cells 52, data to be sent to ERAM cells 213, commands to a sector controller 58 to control which CRAM cells 52 and/or ERAM cells 213 are to be modified with the data, commands to a sector controller 58 to control how the CRAM cells 52 and/or the ERAM cells 213 are modified with the data, and the like.

The device controller 60 of the FPGA 40 may store at least a portion of the data stream 214 in buffer 216, which may be communicatively coupled the device controller 60. The buffer 216 is illustrated as having four channels 218, though any suitable number (more or less) of channels is contemplated. For example, as illustrated, the device controller 60 may store the configuration data authentication key 220 in a first channel 218, the mask authentication key 222 in a second channel 218, the configuration data 224 in a third channel 218, and the mask 226 in a fourth channel 218. The use of the illustrated four (or more) channels 218 enables the configuration data authentication key 220 to be different than the mask authentication key 222. In particular, the device controller 60 may store some, but not all of the configuration data key 220 (e.g., some blocks of data, but not all, of the configuration data key 220) in the first channel 218, some, but not all of the mask authentication key 222 (e.g., some blocks of data, but not all, of the mask authentication key 222) in the second channel 218, some, but not all of the configuration data 224 (e.g., some blocks of data, but not all, of the configuration data 224) in the third channel 218, and some, but not all, of the mask 226 (e.g., some blocks of data, but not all, of the mask 226) in the fourth channel 218. In this manner, the buffer 216 (and its respective channels 218) may be small (e.g., less than the size of the configuration data key 220, the mask authentication key 222, the configuration data 224 and/or the mask 226) relative to the size of the configuration data key 220, the mask authentication key 222, the configuration data 224 and/or the mask 226. Additionally, blocks of the configuration data authentication key 220, the mask authentication key 222, the configuration data 224, and/or the mask 226 may be interleaved together in the data stream 214 with very little overhead. Moreover, a user may sign the mask 226 without signing the configuration data 224, and vice versa. That is, the mask 226 may be freely shared and/or checked without disclosing or sharing the configuration data 224 (e.g., a user design implemented in the configuration data 224).

The device controller 60 may use authentication circuitry or engine 228, which may be communicatively coupled to the device controller 60, to authenticate the configuration data 224 with the configuration data authentication key 220 and the mask 226 with the mask authentication key 222. The authentication circuitry 228 may use any suitable techniques to authenticate the configuration data 224 and the mask 226. In some embodiments, the authentication circuitry 228 uses a secure hash algorithm (e.g., SHA-1). Moreover, the device controller 60 may authenticate the authentication keys 220, 222 themselves with the authentication circuitry 228 using additional authentication keys sent in earlier packets of the data stream 214. In some embodiments, the authentication keys in the data stream 214 may go back to a root key, which may allow the device controller 60 to authenticate with the authentication circuitry 228. In one embodiment, the authentication circuitry 228 uses a public key algorithm to authenticate the root key and/or the additional keys.

In some embodiments, the authenticated configuration data 224 and/or the authenticated mask 226 may be encrypted. As such, the device controller 60 may use decryption circuitry or engine 230, which may be communicatively coupled to the device controller 60, to decrypt the encrypted configuration data 224 and/or the mask 226.

In some embodiments, the configuration data 224 and/or the mask 226 may be compressed. As such, the device controller 60 may then send the configuration data 224 to a buffer 232 of first decompression circuitry or engine 234, which may be communicatively coupled to the device controller 60. Similarly, the device controller 60 may send the mask 226 to a buffer 236 of second decompression circuitry or engine 238, which may be communicatively coupled to the device controller 60. In particular, the device controller 60 may store some, but not all of the configuration data 224 (e.g., some blocks of data, but not all, of the configuration data 224) in the buffer 232 and some, but not all, of the mask 226 (e.g., some blocks of data, but not all, of the mask 226) in the buffer 236. In this manner, the buffers 232, 236 may be small (e.g., less than the size of the configuration data 224 and/or the mask 226) relative to the size of the configuration data 224 and/or the mask 226.

The first compression circuitry 234 may decompress the configuration data 224 in the buffer 232 and the second decompression circuitry 238 may decompress the mask 226 in the buffer 236. In some embodiments, the first compression circuitry 234 may decompress the configuration data 224 in the buffer 232 while the second decompression circuitry 238 decompresses the mask 226 in the buffer 236.

The device controller 60 may then send the configuration data 224 and the mask 226 to partition maintenance (e.g., masking) circuitry or engine 240, which may be communicatively coupled to the device controller 60. The partition maintenance circuitry 240 may maintain reconfigurable partitions of the FPGA 40. Specifically, the partition maintenance circuitry 240 may protect against attempts of partial configuration that inappropriately modify wrong locations by (1) preventing configuration of the FPGA 40 using wrong configuration data, (2) ensuring that the configuration data 224 is correctly located when written, and/or (3) ensuring that the configuration data 224 is written to the correct location.

The partition maintenance circuitry 240 may prevent configuration of the FPGA 40 using wrong configuration data 224 in CRAM cells 52 by ensuring that each bit written to the data register 138 associated with the CRAM cells 52 only has a 1 if the configuration data 224 is allowed to change the bit. For ERAM cells 213, because the device controller 60 may write the configuration data 224 to the entire ERAM due to the addressing scheme associated with the ERAM cells 213, the partition maintenance circuitry 240 may simply ensure that the correct configuration data 224 is written to the ERAM cells 213.

The partition maintenance circuitry 240 may ensure that the configuration data 224 is correctly located when written in CRAM cells 52 by ensuring that that the configuration data in the data register 138 associated with the CRAM cells 52 is correctly aligned before written to the CRAM cells 52. In particular, the device controller 60 may shift packets of the configuration data 224 into the data register 138 as the packets arrive. If thee packets are not shifted correctly (e.g., by the correct amount as defined by packet length), the configuration data 224 will be incorrectly located and thus the wrong configuration data will be written to the CRAM cells 52. For ERAM cells 213, because the device controller 60 may write the configuration data 224 to the entire ERAM due to the addressing scheme associated with the ERAM cells 213, the partition maintenance circuitry 240 may simply ensure that the correct configuration data 224 is written to the ERAM cells 213.

The partition maintenance circuitry 240 may ensure that the configuration data 224 is written to the correct CRAM cells 52 by ensuring that the configuration data 224 is written to the correct sector 48 and correct address in an address map of the sector 48. Specifically, the partition maintenance circuitry 240 may validate command packets in the configuration data 224. The partition maintenance circuitry 240 may also ensure that the correct configuration data 224 is written to the correct ERAM cells 213 by ensuring that the correct row address of the ERAM is selected. Specifically, the partition maintenance circuitry 240 may validate command packets in the configuration data 224. Additionally, the partition maintenance circuitry 240 may validate the first word in an ERAM data packet, because the column address of an ERAM may be defined in the first word in the ERAM data packet.

Figure 10:
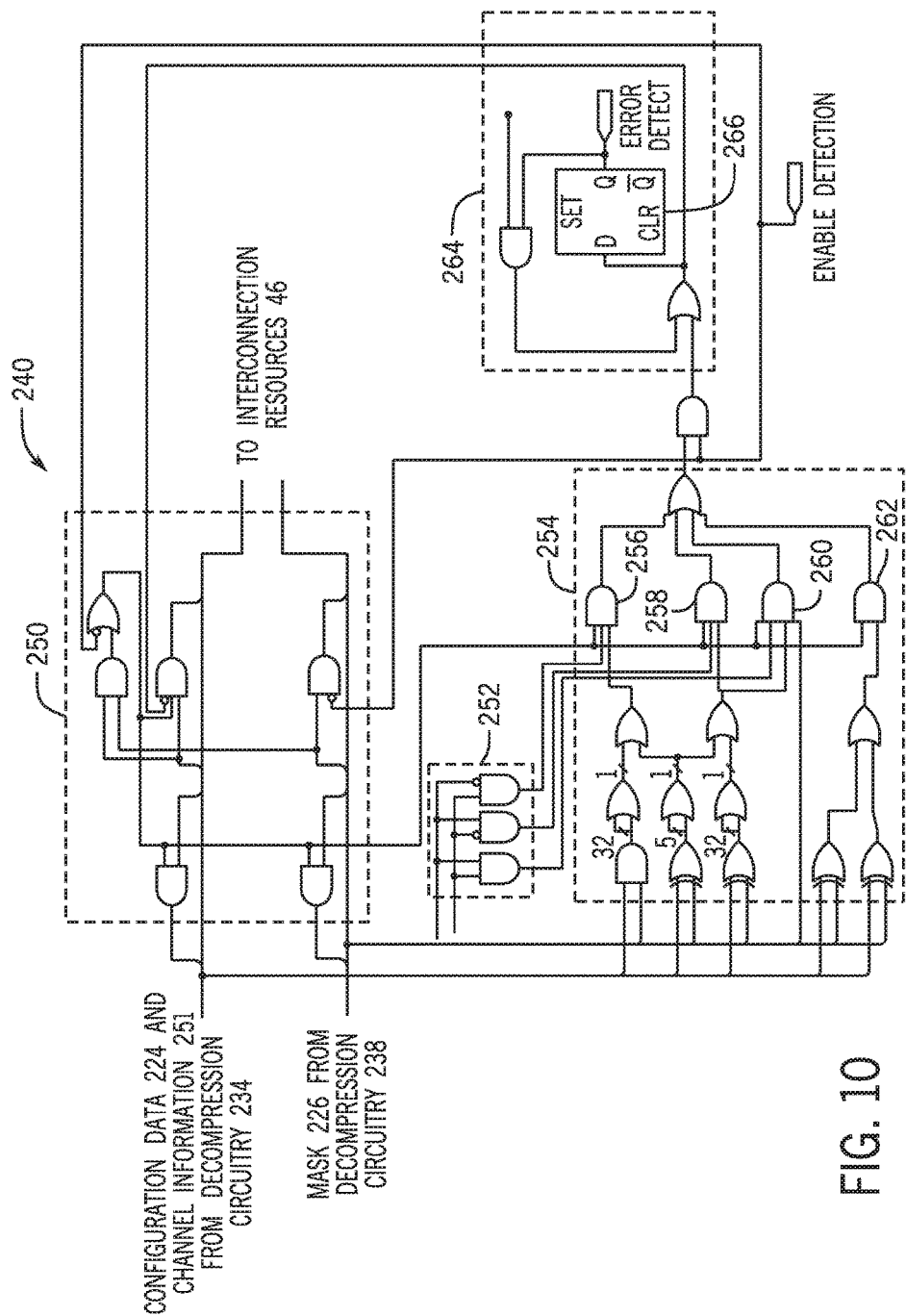
FIG. 10 is a schematic diagram of partition maintenance circuitry of FIG. 9, according to an embodiment of the present disclosure.

FIG. 10 is a schematic diagram of the partition maintenance circuitry 240 of FIG. 9, according to an embodiment of the present disclosure. The partition maintenance circuitry 240 may receive as inputs the configuration data 224 from the decompression circuitry 234 and the mask 226 from the decompression circuitry 238. The partition maintenance circuitry 240 may include alignment and blocking circuitry 250 that may ensure that configuration data packets and mask data packets are aligned or move in lock step. The alignment and blocking circuitry 250 may also ensure that mask data packets are not sent to the interconnection resources 46. The alignment and blocking circuitry 250 may ensure that if an incorrect comparison of packets occurs, any mask data packet is blocked before the EOP signal occurs. In some embodiments, the sector controller 58 and/or the alignment and blocking circuitry 250 may ensure that a packet without an EOP signal does not affect a respective sector 48 associated with the sector controller 58 (e.g., by preventing changes or modifications to the respective sector 48 before receiving an EOP signal), thus preventing corruption of the respective sector 48. While the alignment and blocking circuitry 250 is illustrated as a specific combination of AND gates and an OR gate, it should be understood than any suitable combination of circuit logic is contemplated to perform the functions of the alignment and blocking circuitry 250.

The partition maintenance circuitry 240 may ensure that channel information 251 encoded with the configuration data 224 and the mask 226 is compared correctly. As illustrated, the partition maintenance circuitry 240 receives the channel information 251 from the decompression circuitry 234. However, in additional or alternative embodiments, the partition maintenance circuitry 240 may receive the channel information 251 from any suitable source, such as the decompression circuitry 238. The channel information 251 may inform the interconnection resources 46 where to send and how to format the configuration data 224. The channel information 251 may be part of the data stream 214 and/or be provided separately for the decompression circuitries 234, 238. As such, the channel information 251 may be authenticated uniquely (e.g., separately, at different times, using different algorithms, and the like) for the decompression circuitries 234, 238.

The channel information 251 may include one or more bits that encode an operation to be performed using the configuration data 224 and/or the mask 226. For example, as illustrated, the channel information 251 is expressed by two bits, and the encoding and corresponding operations are described in Table 1 below (where "&" denotes an AND operator, "+" denotes an OR operator, and "^" denotes an XOR operator):

TABLE 1

| Channel Encoding | Packet Type | Operation to perform on data. |
|---|---|---|
| AND Type 01 | CRAM Data | Error = (Data$_{DC0}$ & Data$_{DC1}$ != 0) + (Channel $_{DC0}$ ^ Channel$_{DC1}$!= 0) + (SOP $_{DC0}$ ^ SOP$_{DC1}$!= 0) + (EOP $_{DC0}$ ^ EOP$_{DC1}$!= 0) |
| XOR Type 10 | CMD | Error = (Data$_{DC0}$ ^ Data$_{DC1}$ != 0) + (Channel $_{DC0}$ ^ Channel$_{DC1}$!= 0) + (SOP $_{DC0}$ ^ SOP$_{DC1}$!= 0) + (EOP $_{DC0}$ ^ EOP$_{DC1}$!= 0) |
| XOR 11 | ERAM Data | Error = ((Data$_{DC0}$ ^ Data$_{DC1}$ != 0) + (Channel $_{DC0}$ ^ Channel$_{DC1}$!= 0)) & (SOP $_{DC0}$ ^ SOP$_{DC1}$!= 0) + (SOP $_{DC0}$ ^ SOP$_{DC1}$!= 0) + (EOP $_{DC0}$ ^ EOP$_{DC1}$!= 0) |
| Packet Boundary 00 | Any | Error = (SOP $_{DC0}$ ^ SOP$_{DC1}$!= 0)+ (EOP$_{DC0}$ ^ EOP$_{DC1}$!= 0) |

In particular, the partition maintenance circuitry 240 may include channel decoding circuitry 252 that may decode the channel information bits. While the channel decoding circuitry 252 is illustrated as a specific combination of AND gates, it should be understood than any suitable combination of circuit logic is contemplated to perform the functions of the channel decoding circuitry 252. Channel operation circuitry 254 of the partition maintenance circuitry 240 may perform one or more operations (illustrated in Table 1) using the configuration data 224 and/or the mask 226 based on the decoded channel information bits.

The channel operation circuitry 254 may perform the AND Type operation encoded as 01 (as illustrated in Table 1) to detect any errors associated with CRAM data. The channel operation circuitry 254 may output an indication of an error based on performing the AND Type operation at the output of AND gate 256.

The channel operation circuitry 254 may perform the XOR Type operation encoded as 10 (as illustrated in Table 1) to detect any errors associated with a command packet. The channel operation circuitry 254 may output an indication of an error based on performing the XOR Type operation at the output of AND gate 258.

The channel operation circuitry 254 may perform the XOR operation encoded as 11 (as illustrated in Table 1) to detect any errors associated with ERAM data. The channel operation circuitry 254 may output an indication of an error based on performing the XOR operation at the output of AND gate 260.

The channel operation circuitry 254 may perform the packet boundary operation encoded as 00 (as illustrated in Table 1) to detect any errors associated with packet boundaries. In particular, start of packet (SOP) and/or EOP signals may be compared in packets to determine whether there are any errors associated with packet boundaries. The channel operation circuitry 254 may output an indication of an error based on performing the packet boundary operation at the output of AND gate 262.

While the channel operation circuitry 254 is illustrated as a specific combination of AND gates, OR gates, and XOR gates, it should be understood than any suitable combination of circuit logic is contemplated to perform the functions of the channel operation circuitry 254. Moreover, it should be understood that any suitable encoding scheme may be used to encode the operations illustrated in Table 1.

The partition maintenance circuitry 240 may include error detection circuitry 264 that may detect, store, and send an indication of an error based on the channel operation circuitry 254. In particular, if the channel operation circuitry 254 outputs an indication of an error as illustrated in Table 1, the error detection circuitry 264 may latch the indication of the error using latch 266 until the error is cleared (e.g., by a sector controller 58, a device controller 60, a system processor, and the like). While the error detection circuitry 264 is illustrated as a specific combination of an AND gate, an OR gate, and a latch, it should be understood than any suitable combination of circuit logic is contemplated to perform the functions of the error detection circuitry 264.

In this manner, the partition maintenance circuitry 240 may maintain reconfigurable partitions in the FPGA 40. Doing so may prevent unauthorized or improper modifications to CRAM cells 52 and/or ERAM cells 213 of other reconfigurable partitions. In addition, the device controller 60 and/or the sector controllers 58 may only perform committed operations upon receiving an End of Packet (EOP) signal. This may prevent a malicious packet from being committed prior to sending the EOP signal.

If the partition maintenance circuitry 240 does not generate or detect an error as illustrated in Table 1, then the configuration data 224 has been validated or verified to not perform unauthorized or improper modifications to CRAM cells 52 and/or ERAM cells 213 of other reconfigurable partitions of the FPGA 40. Turning back to FIG. 9, the validated or verified configuration data 224 is sent to the interconnection resources 46 to be distributed to one or more sectors 48 of the FPGA 40. In some embodiments, the mask 226 may also be sent to the interconnection resources 46. On arriving at the one or more sectors 48, the configuration data 224 may be stored in one or more respective data registers 138, from which one or more sector controllers 58 modify contents of respective CRAM cells 52 and/or ERAM cells 213.

Figure 11:
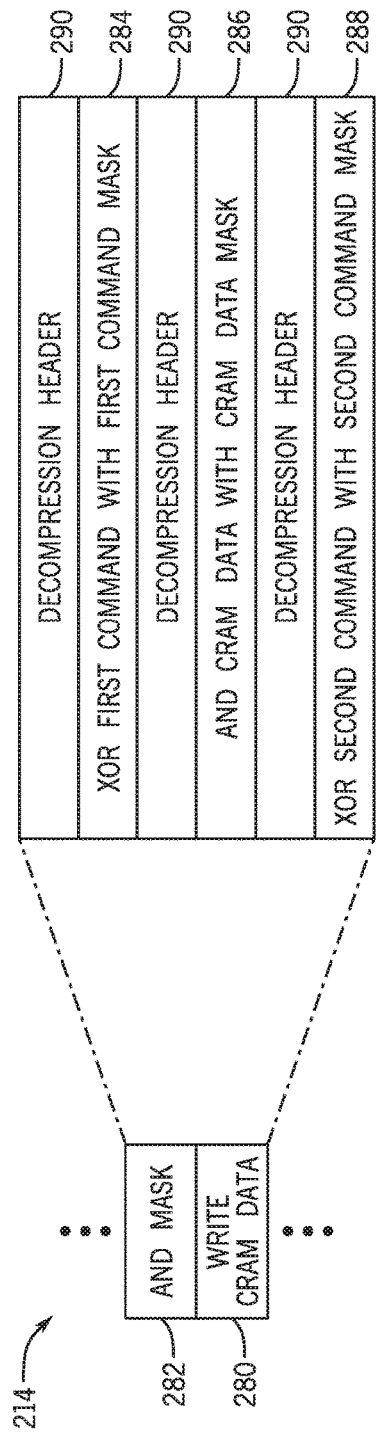
FIG. 11 is a block diagram of a portion of a data stream used to configure the programmable logic device of FIG. 2 by writing data in configuration random access memory cells of the programmable logic device, according to an embodiment of the present disclosure.

As an example, FIG. 11 is a block diagram of a portion of a data stream 214 used to configure the FPGA 40 by writing data in CRAM cells 52 of the FPGA 40, according to an embodiment of the present disclosure. The portion of the data stream 214 includes an instruction 280 to write CRAM data and a corresponding instruction 282 to perform an AND operation with a mask. Writing CRAM data may include performing one or commands with the data to be written to the CRAM cells 52.

As such, the corresponding instruction 282 may include several components, including performing an XOR operation 284 between a first command and a first command mask, performing an AND operation 286 between CRAM data and a CRAM data mask, and performing an XOR operation 288 between a second command and a second command mask. Additionally, the corresponding instruction 282 includes a decompression header 290 before each comparison operation.

Figure 12:
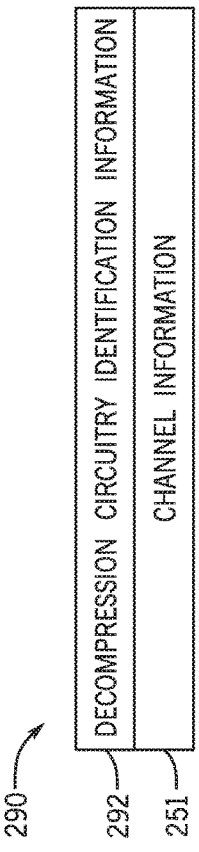
FIG. 12 is a block diagram of a decompression header of FIG. 11, according to an embodiment of the present disclosure.

FIG. 12 is a block diagram of the decompression header 290 of FIG. 11, according to an embodiment of the present disclosure. The decompression header 290 may include decompression circuitry identification information 292 that enable setting up which decompression circuitry (e.g., 234, 238) configuration data 224 associated with the decompression header 290 is routed to. The decompression header 290 may also include channel information 251 which define the comparison operation (e.g., as illustrated in Table 1) to be performed on the associated configuration data 224.

Figure 13:
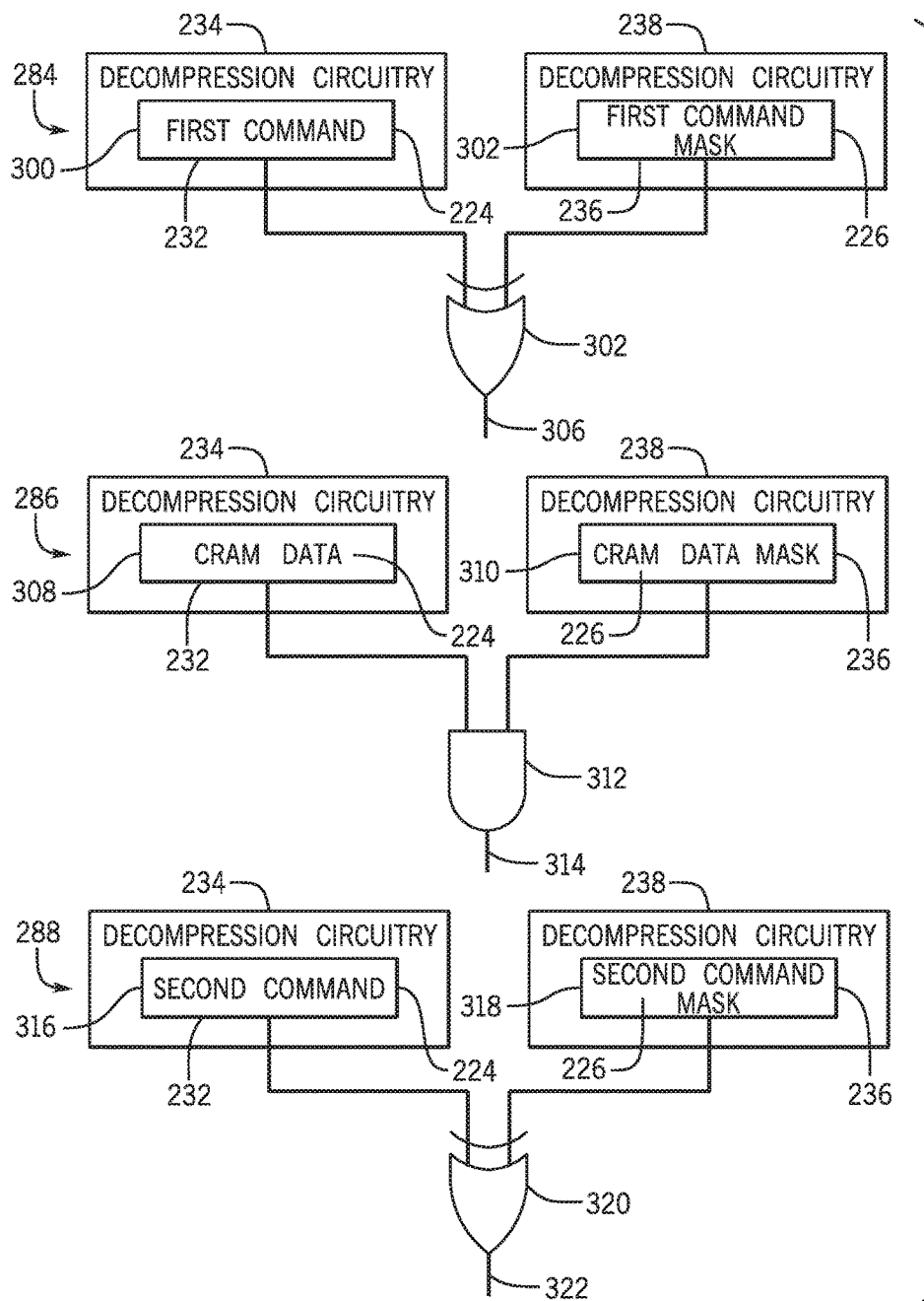
FIG. 13 is a representative diagram of performing the portion of the data stream of FIG. 11 used to configure the programmable logic device of FIG. 2 by writing data in the configuration random access memory cells of the programmable logic device, according to an embodiment of the present disclosure.

FIG. 13 is a representative diagram of performing the portion of the data stream 214 of FIG. 11 used to configure the FPGA 40 by writing data in the CRAM cells 52 of the FPGA 40, according to an embodiment of the present disclosure. In particular, to perform the XOR operation 284 between a first command 300 (which may be stored as the configuration data 224) and a first command mask 302, the device controller 60 may input the first command 300 stored in the buffer 232 of the first decompression circuitry 234 and the first command mask 302 stored in the buffer 236 of the second decompression circuitry 238 into an XOR gate 304. While the XOR gate 304 is illustrated, it should be understood than any suitable combination of circuit logic is contemplated to perform the XOR operation 284 between the first command 300 and the first command mask 302. The output 306 of the XOR gate 304 includes configuration data that may be programmed in the FPGA 40 while maintaining the reconfigurable partitions of the FPGA 40.

To perform the AND operation 286 between CRAM data 308 (which may be stored as the configuration data 224) and a CRAM data mask 310, the device controller 60 may input the CRAM data 308 stored in the buffer 232 of the first decompression circuitry 234 and the CRAM data mask 310 stored in the buffer 236 of the second decompression circuitry 238 into an AND gate 312. While the AND gate 312 is illustrated, it should be understood than any suitable combination of circuit logic is contemplated to perform the AND operation 286 between the CRAM data 308 and the CRAM data mask 310. The output 314 of the AND gate 312 includes configuration data that may be programmed in the FPGA 40 while maintaining the reconfigurable partitions of the FPGA 40.

To perform the XOR operation 288 between a second command 316 (which may be stored as the configuration data 224) and a second command mask 318, the device controller 60 may input the second command 316 stored in the buffer 232 of the first decompression circuitry 234 and the second command mask 318 stored in the buffer 236 of the second decompression circuitry 238 into an XOR gate 320. While the XOR gate 320 is illustrated, it should be understood than any suitable combination of circuit logic is contemplated to perform the XOR operation 288 between the second command 316 and the second command mask 318. The output 322 of the XOR gate 320 includes configuration data that may be programmed in the FPGA 40 while maintaining the reconfigurable partitions of the FPGA 40.

Figure 14:
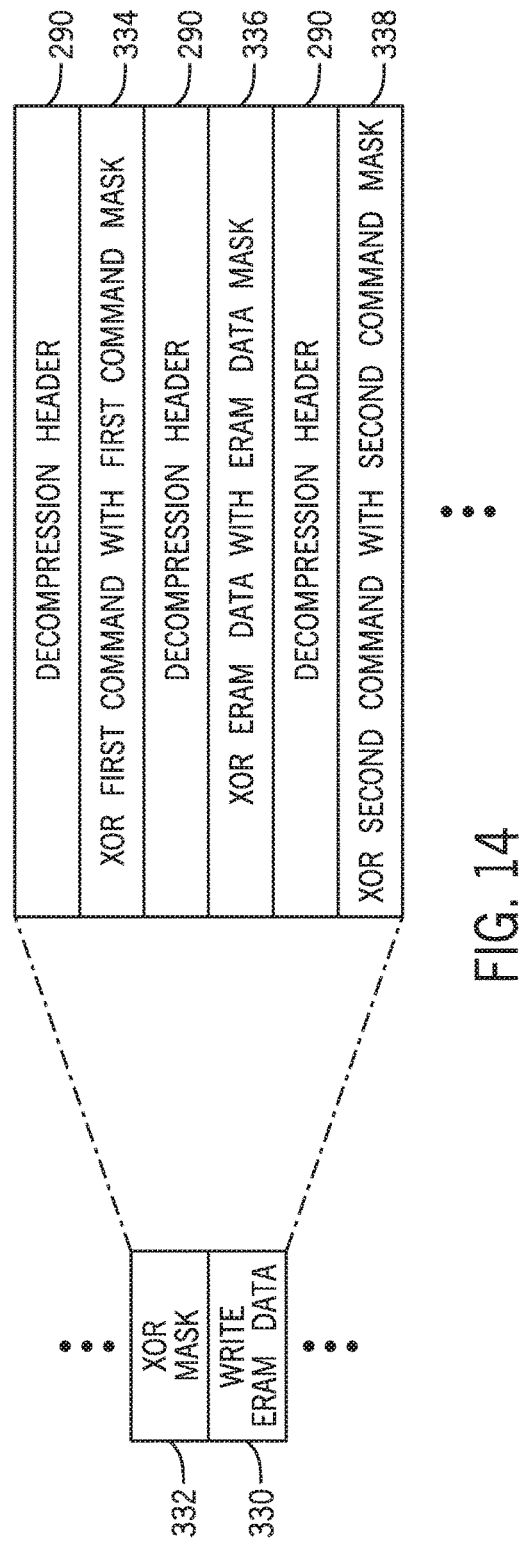
FIG. 14 is a block diagram of a portion of a data stream used to configure the programmable logic device of FIG. 2 by writing data in embedded random access memory cells of the programmable logic device, according to an embodiment of the present disclosure.

As another example, FIG. 14 is a block diagram of a portion of a data stream 214 used to configure the FPGA 40 by writing data in ERAM cells 213 of the FPGA 40, according to an embodiment of the present disclosure. The portion of the data stream 214 includes an instruction 330 to write ERAM data and a corresponding instruction 332 to perform an XOR operation with a mask. Writing ERAM data may include performing one or commands with the data to be written to the ERAM cells 213.

As such, the corresponding instruction 332 may include several components, including performing an XOR operation 334 between a first command and a first command mask, performing an XOR operation 336 between ERAM data and an ERAM data mask, and performing an XOR operation 338 between a second command and a second command mask. Because the column address of an ERAM may be defined in the first word in the ERAM data packet, the XOR operation 336 may be performed on a first word of ERAM data and the ERAM data mask. Additionally, the corresponding instruction 332 includes a decompression header 290 before each comparison operation.

Figure 15:
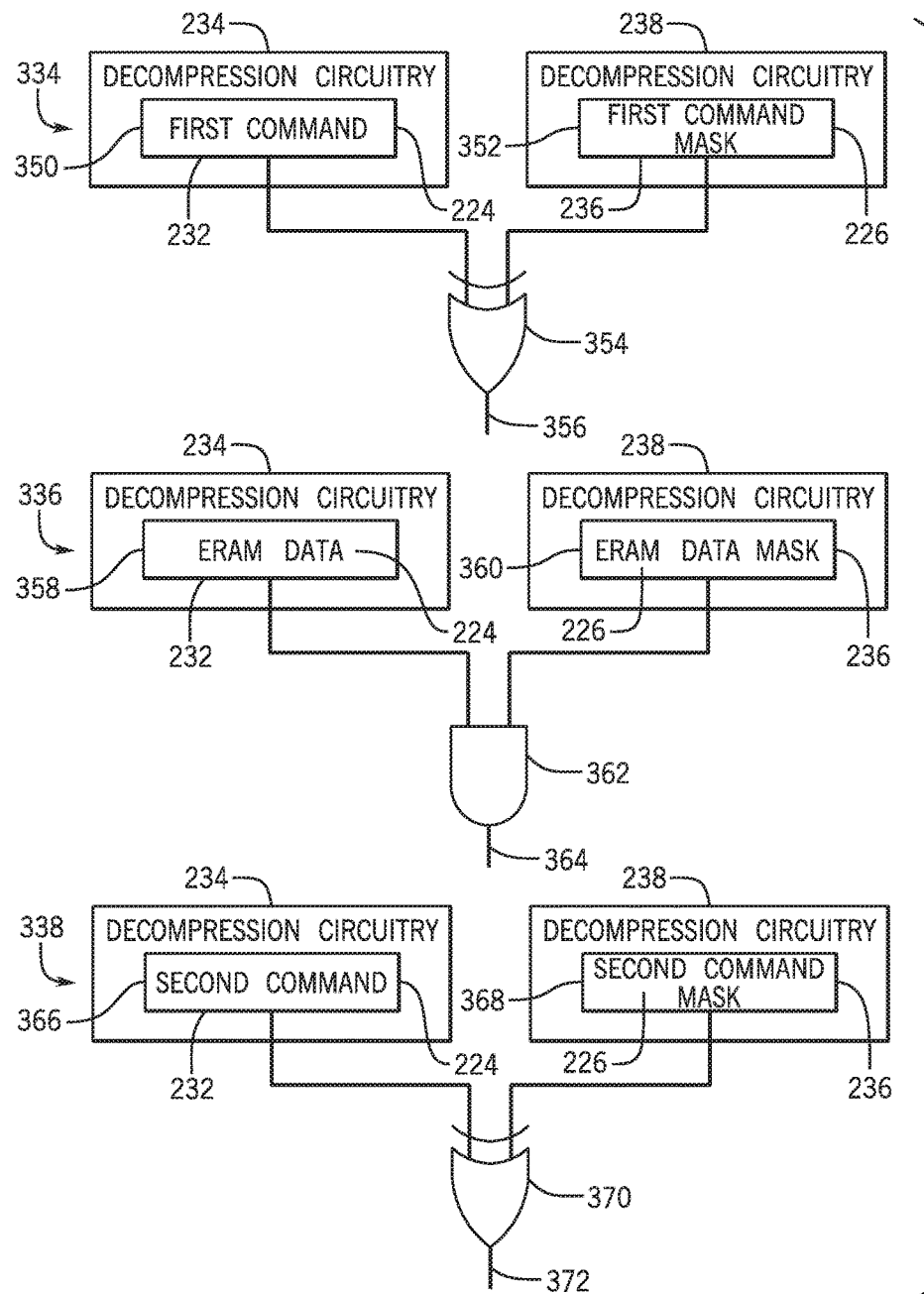
FIG. 15 is a representative diagram illustrating performing masking operations on the portion of the data stream of FIG. 14 used to configure the programmable logic device of FIG. 2 by writing data in the embedded random access memory cells of the programmable logic device, according to an embodiment of the present disclosure.

FIG. 15 is a representative diagram illustrating performing masking operations on the portion of the data stream 214 of FIG. 14 used to configure the FPGA 40 by writing data in the ERAM cells 213 of the FPGA 40, according to an embodiment of the present disclosure. In particular, to perform the XOR operation 334 between a first command 350 (which may be stored as the configuration data 224) and a first command mask 352, the device controller 60 may input the first command 350 stored in the buffer 232 of the first decompression circuitry 234 and the first command mask 352 stored in the buffer 236 of the second decompression circuitry 238 into an XOR gate 354. While the XOR gate 354 is illustrated, it should be understood than any suitable combination of circuit logic is contemplated to perform the XOR operation 354 between the first command 350 and the first command mask 352. The output 356 of the XOR gate 354 includes configuration data that may be programmed in the FPGA 40 while maintaining the reconfigurable partitions of the FPGA 40.

To perform the XOR operation 336 between ERAM data 358 (which may be stored as the configuration data 224) and an ERAM data mask 360, the device controller 60 may input the ERAM data 358 stored in the buffer 232 of the first decompression circuitry 234 and the ERAM data mask 360 stored in the buffer 236 of the second decompression circuitry 238 into an XOR gate 362. Because the column address of an ERAM may be defined in the first word in the ERAM data packet, the device controller 60 may send the first word of the ERAM data 358 to the XOR gate 362 with the ERAM data mask 360. While the XOR gate 362 is illustrated, it should be understood than any suitable combination of circuit logic is contemplated to perform the XOR operation 336 between the ERAM data 358 and the ERAM data mask 360. The output 364 of the XOR gate 362 includes configuration data that may be programmed in the FPGA 40 while maintaining the reconfigurable partitions of the FPGA 40.

To perform the XOR operation 338 between a second command 366 (which may be stored as the configuration data 224) and a second command mask 368, the device controller 60 may input the second command 366 stored in the buffer 232 of the first decompression circuitry 234 and the second command mask 368 stored in the buffer 236 of the second decompression circuitry 238 into an XOR gate 370. While the XOR gate 370 is illustrated, it should be understood than any suitable combination of circuit logic is contemplated to perform the XOR operation 288 between the second command 366 and the second command mask 368. The output 372 of the XOR gate 370 includes configuration data that may be programmed in the FPGA 40 while maintaining the reconfigurable partitions of the FPGA 40.

Figure 16:
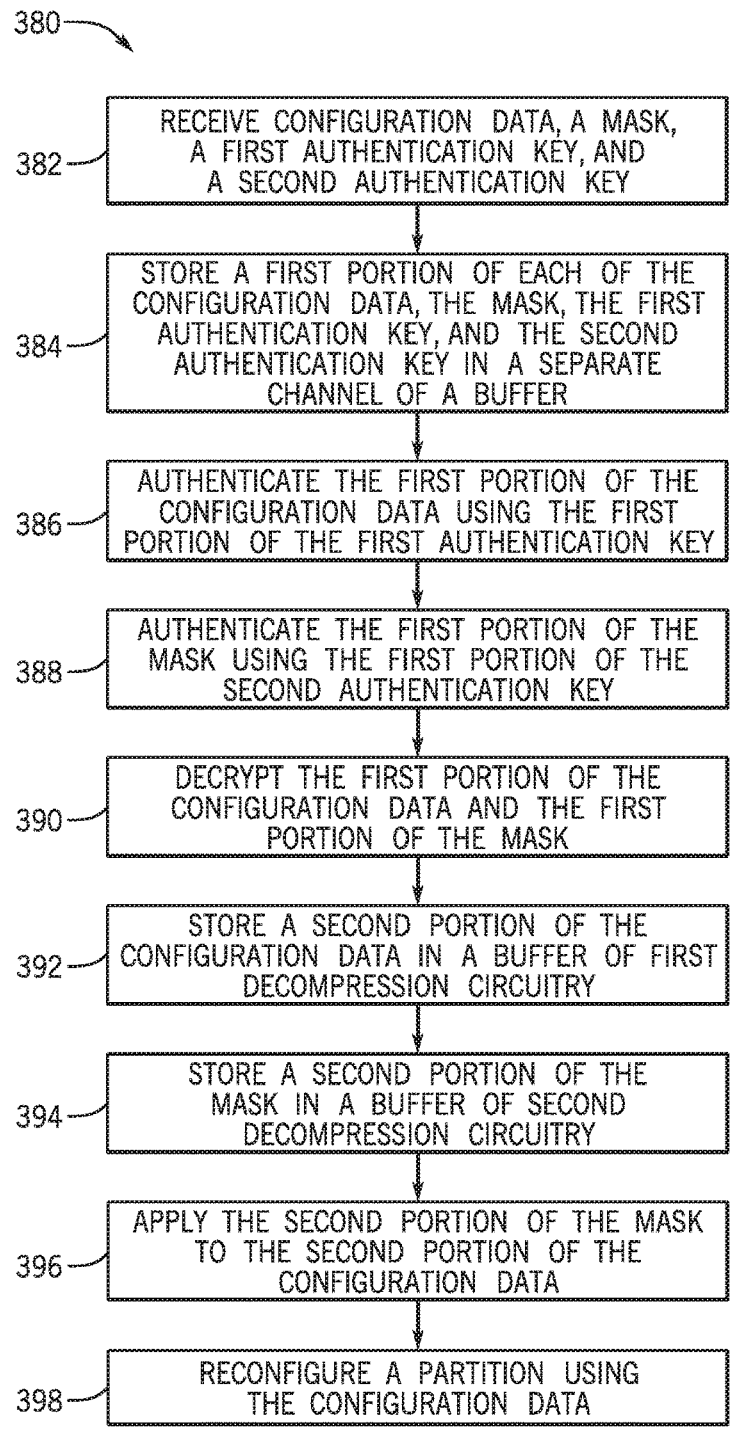
FIG. 16 is a flow diagram illustrating a process for partially reconfiguring a programmable fabric while maintaining reconfigurable partitions using the system of FIG. 9, according to an embodiment of the present disclosure.

FIG. 16 is a flow diagram illustrating a process 380 for partially reconfiguring a programmable fabric while maintaining reconfigurable partitions using the system 210 of FIG. 9, according to an embodiment of the present disclosure. The process 380 may be performed by any suitable device or combination of devices that may perform the steps described below. While the process 380 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 380 may be implemented by the device controller 60 and/or one or more sector controllers 58 of the FPGA 40.

The device controller 60 may receive (process block 382) configuration data 224, a mask 226, a first authentication key (e.g., a configuration data key 220) and a second authentication key (e.g., a mask key 222). The device controller 60 may store (process block 384) at least a first portion of each of the configuration data 224, a mask 226, the first authentication key 220, and the second authentication key 222 in a separate channel 218 of a buffer 216. In particular, the device controller 60 may store some, but not all of the configuration data key 220 (e.g., some blocks of data, but not all, of the configuration data key 220) in a first channel 218, some, but not all of the mask authentication key 222 (e.g., some blocks of data, but not all, of the mask authentication key 222) in a second channel 218, some, but not all of the configuration data 224 (e.g., some blocks of data, but not all, of the configuration data 224) in a third channel 218, and some, but not all, of the mask 226 (e.g., some blocks of data, but not all, of the mask 226) in a fourth channel 218. In this manner, the buffer 216 (and its respective channels 218) may be small (e.g., less than the size of the configuration data key 220, the mask authentication key 222, the configuration data 224 and/or the mask 226) relative to the size of the configuration data key 220, the mask authentication key 222, the configuration data 224 and/or the mask 226.

The device controller 60 may then authenticate (process block 386) at least the first portion of the configuration data 224 using at least the first portion of the first authentication key 220. In particular, the device controller 60 may authenticate a portion of the configuration data 224 using a portion of the first authentication key 220, based on the portion of the configuration data 224 stored in a channel 218 of the buffer 216 and the portion of the first authentication key 220 stored in a channel 218 of the buffer 216.

The device controller 60 may also authenticate (process block 388) at least the first portion of the mask 226 using at least the first portion of the second authentication key 222. In particular, the device controller 60 may authenticate a portion of the mask 226 using a portion of the second authentication key 222, based on the portion of the mask 226 stored in a channel 218 of the buffer 216 and the portion of the second authentication key 222 stored in a channel 218 of the buffer 216. Because each of the configuration data 224, a mask 226, the first authentication key 220, and the second authentication key 222 are in a separate channel 218 of the buffer 216, the first authentication key 220 may be different than the second authentication key 222. In some embodiments, the device controller 60 may decrypt (process block 390) at least the first portion of the configuration data 224 and/or at least the first portion of the mask 226.

The device controller 60 may store (process block 392) at least a second portion of the configuration data 224 in a buffer 232 of first decompression circuitry 234. The device controller 60 may also store (process block 394) at least a second portion of the mask 226 in a buffer 236 of second decompression circuitry 238. In particular, the device controller 60 may store some, but not all of the configuration data 224 (e.g., some blocks of data, but not all, of the configuration data 224) in the buffer 232 and some, but not all, of the mask 226 (e.g., some blocks of data, but not all, of the mask 226) in the buffer 236. In this manner, the buffers 232, 236 may be small (e.g., less than the size of the configuration data 224 and/or the mask 226) relative to the size of the configuration data 224 and/or the mask 226. The second portion of the configuration data 224 in the buffer 232 may be the same as or may be different from the first portion of the configuration data 224 in the buffer 218, based, for example, on the sizes of the buffers 232, 218. Similarly, the second portion of the mask 226 in the buffer 236 may be the same as or may be different from the first portion of mask 226 stored in the buffer 218, based, for example, on the sizes of the buffers 236, 218.

The device controller 60 may then apply (process block 396) at least the second portion of the mask 226 to at least the second portion of the configuration data 224, e.g., as described in FIG. 17 below. In some embodiments, the first compression circuitry 234 may decompress at least the second portion of the configuration data 224 in the buffer 232 while the second decompression circuitry 238 decompresses at least the second portion of the mask 226 in the buffer 236. The device controller 60 may then reconfigure a partition of the FPGA 40 using the configuration data 224.

Figure 17:
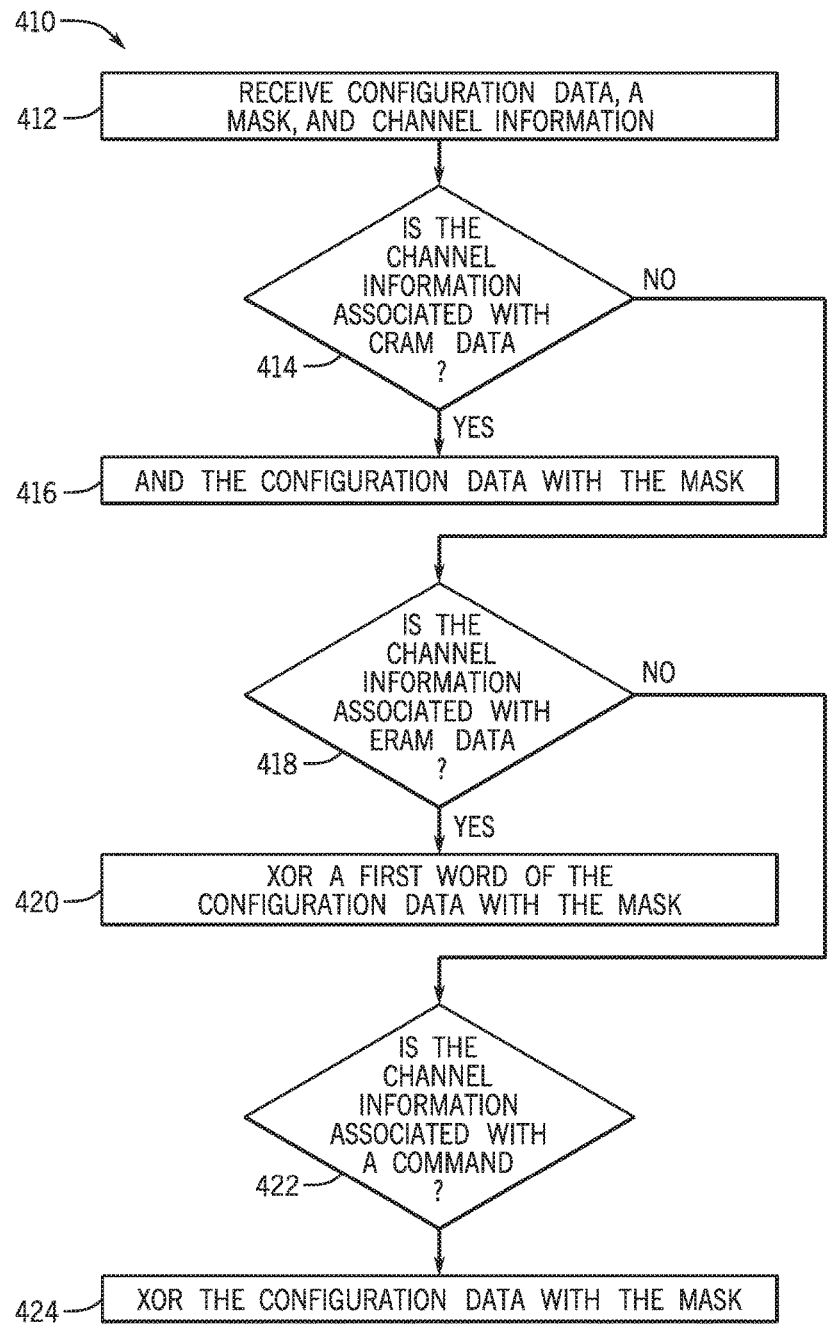
FIG. 17 is a flow diagram illustrating a process for applying a mask to configuration data as described in FIG. 16, according to an embodiment of the present disclosure.

FIG. 17 is a flow diagram illustrating a process 410 for applying a mask 226 to configuration data 224 as described in FIG. 16, according to an embodiment of the present disclosure. The process 410 may be performed by any suitable device or combination of devices that may perform the steps described below. While the process 410 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 410 may be implemented by the device controller 60 and/or one or more sector controllers 58 of the FPGA 40.

The device controller 60 may receive (process block 412) the configuration data 224, the mask 226, and channel information 251. The channel information 251 may inform the interconnection resources 46 where to send and how to format the configuration data 224. The channel information 251 may be part of the data stream 214 and/or be provided separately for the decompression circuitries 234, 238. As such, the channel information 251 may be authenticated uniquely (e.g., separately, at different times, using different algorithms, and the like) for the decompression circuitries 234, 238. In particular, the channel information 251 may include one or more bits that encode an operation to be performed using the configuration data 224 and/or the mask 226. For example, Table 1 expresses the channel information 251 in two bits and describes the encoding and associated operations.

The device controller 60 may then determine (decision block 414) whether the channel information 251 is associated with CRAM data. If so, the device controller 60 performs an AND operation (process block 416) between the configuration data 224 and the mask 226. In some embodiments, the device controller 60 may perform an AND operation between a portion of the configuration data 224 and a portion of the mask 226.

If the channel information 251 is not associated with CRAM data, the device controller 60 may determine (decision block 418) whether the channel information 251 is associated with ERAM data. If so, the device controller 60 performs an XOR operation (process block 420) between the configuration data 224 and the mask 226. In some embodiments, the device controller 60 may perform an XOR operation between a portion of the configuration data 224 and a portion of the mask 226. For example, because the column address of an ERAM may be defined in the first word in the ERAM data packet, the device controller 60 may perform the XOR operation on a first word of the configuration data 224.

If the channel information 251 is not associated with ERAM data, the device controller 60 may determine (decision block 422) whether the channel information 251 is associated with a command. If so, the device controller 60 performs an XOR operation (process block 424) between the configuration data 224 and the mask 226. In some embodiments, the device controller 60 may perform an XOR operation between a portion of the configuration data 224 and a portion of the mask 226.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for maintaining reconfigurable partitions in an integrated device comprising:
   a first buffer comprising:
      a first channel configured to store at least a first portion of configuration data;
      a second channel configured to store at least a first portion of a mask;
   first decompression circuitry comprising a second buffer coupled to the first buffer, wherein the second buffer is configured to store at least a second portion of the configuration data, wherein the first decompression circuitry is configured to decompress at least the second portion of the configuration data;
   second decompression circuitry comprising a third buffer coupled to the first buffer, wherein the third buffer is configured to store at least a second portion of the mask, wherein the second decompression circuitry is configured to decompress at least the second portion of the mask; and
   partition maintenance circuitry configured to apply at least the second portion of the mask to at least the second portion of the configuration data after the first decompression circuitry has decompressed at least the second portion of the configuration data and the second decompression circuitry has decompressed at least the second portion of the mask.

2. The system of claim 1, wherein the first buffer comprises:
   a third channel configured to store at least a first portion of a first authentication key; and
   a fourth channel configured to store at least a first portion of a second authentication key.

3. The system of claim 2, comprising authentication circuitry configured to authenticate at least the first portion of the configuration data with at least the first portion of the first authentication key and authenticate at least the first portion of the mask using at least the first portion of the second authentication key.

4. The system of claim 3, wherein:
the second buffer is configured to store at least the second portion of the configuration data after the authentication circuitry has authenticated at least the first portion of configuration data; and
the third buffer is configured to store at least a second portion of the mask after the authentication circuitry has authenticated at least the first portion of the mask.

5. The system of claim 1, comprising decryption circuitry configured to decrypt at least the first portion of the configuration data and at least the first portion of the mask.

6. The system of claim 1, comprising interconnection resources configured to send the configuration data to one or more sectors of the integrated circuit.

7. The system of claim 1, wherein the configuration data is configured to reconfigure a partition of the integrated circuit when programmed in the integrated circuit.

8. The system of claim 7, wherein the mask is configured to maintain other partitions of the integrated circuit by preventing unauthorized modifications to the other partitions when the configuration data is programmed in the integrated circuit.

9. The system of claim 1, wherein the mask is configured to be shared, checked, signed, or any combination thereof, without sharing the configuration data.

10. An integrated circuit comprising:
first decompression circuitry configured to decompress at least a portion of configuration data, wherein the first decompression circuitry comprises a first buffer configured to store at least the portion of the configuration data;
second decompression circuitry configured to decompress at least a portion of a mask, wherein the second decompression circuitry comprises a second buffer configured to store at least the portion of the mask; and
partition maintenance circuitry configured to apply at least the portion of the mask to at least the portion of the configuration data after the first decompression circuitry has decompressed at least the portion of the configuration data and the second decompression circuitry has decompressed at least the portion of the mask by:
performing an AND operation between at least the portion of the configuration data and at least the portion of the mask when the configuration data is associated with configuration random access memory data;
performing an XOR operation between at least the portion of the configuration data and at least the portion of the mask when the configuration data is associated with embedded random access memory data; and
performing an XOR operation between at least the portion of the configuration data and at least the portion of the mask when the configuration data is associated with a command.

11. The integrated circuit of claim 10, wherein performing the XOR operation between at least the portion of the configuration data and at least the portion of the mask when at least the portion of the configuration data is associated with embedded random access memory data comprises performing the XOR operation between a first word of the configuration data and at least the portion of the mask.

12. The integrated circuit of claim 10, comprising a first buffer that comprises:
a first channel configured to store at least a second portion of the configuration data;
a second channel configured to store at least a second portion of the mask;
a third channel configured to store at least a portion of a first authentication key; and
a fourth channel configured to store at least a portion of a second authentication key.

13. The integrated circuit of claim 12, comprising authentication circuitry configured to authenticate at least the second portion of the configuration data with at least the portion of the first authentication key and authenticate at least the second portion of the mask using at least the portion of the second authentication key.

14. The integrated circuit of claim 10, wherein the partition maintenance circuitry comprises channel decoding circuitry configured to decode channel information to determine an operation to perform on at least the portion of the configuration data, at least the portion of the mask, or a combination thereof.

15. The integrated circuit of claim 14, wherein the partition maintenance circuitry comprises error detection circuitry configured to detect an indication of an error based on performing the AND operation between at least the portion of the configuration data and at least the portion of the mask when at least the portion of the configuration data is associated with the configuration random access memory data, performing the XOR operation between at least the portion of the configuration data and at least the portion of the mask when at least the portion of the configuration data is associated with the embedded random access memory data, or performing the XOR operation between at least the portion of the configuration data and at least the portion of the mask when at least the portion of the configuration data is associated with the command.

16. The integrated circuit of claim 15, wherein the error detection circuitry comprises a latch configured to store the indication of the error.

17. A method for maintaining reconfigurable partitions in an integrated device comprising:
receiving, via a device controller of the integrated circuit, configuration data, a mask;
storing, via the device controller, at least a first portion of each of the configuration data and the mask in a separate channel of a first buffer;
storing, via the device controller, at least a second portion of the configuration data in a second buffer of first decompression circuitry, wherein the second buffer is coupled to the first buffer;
storing, via the device controller, at least a second portion of the mask in a third buffer of second decompression circuitry, wherein the third buffer is coupled to the first buffer;
applying, via the device controller, at least the second portion of the mask to at least the second portion of the configuration data; and
reconfiguring, via the device controller, a partition of the integrated circuit using the configuration data.

18. The method of claim 17, wherein applying, via the device controller, at least the second portion of the mask to at least the second portion of the configuration data comprises performing, via the device controller, an AND operation between at least the second portion of the configuration data and at least the second portion of the mask when at least the second portion of the configuration data is associated with configuration random access memory data.

19. The method of claim 17, wherein applying, via the device controller, at least the second portion of the mask to at least the second portion of the configuration data comprises performing, via the device controller, an XOR operation between at least the second portion of the configuration data and at least the second portion of the mask when at least the second portion of the configuration data is associated with embedded random access memory data.

20. The method of claim 17, wherein applying, via the device controller, at least the second portion of the mask to at least the second portion of the configuration data comprises performing, via the device controller, an XOR operation between the at least the second portion of configuration data and at least the second portion of the mask when at least the second portion of the configuration data is associated with a command.

* * * * *